Figure 1:
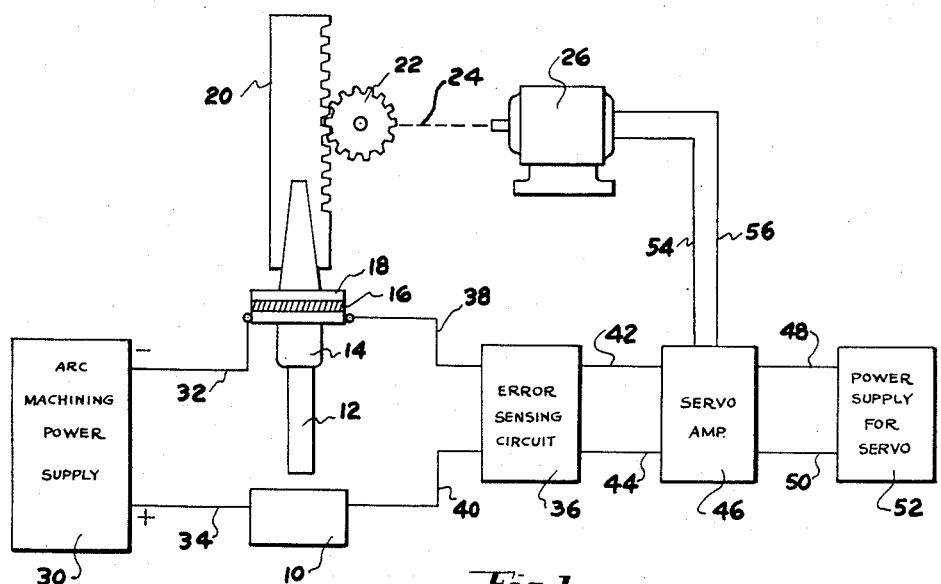

March 1, 1960 V. E. MATULAITIS 2,927,191

SERVO POWER FEED

Filed Feb. 10, 1959

INVENTOR.
VICTOR E. MATULAITIS.

BY
*[signature]*
ATTORNEY ic Office 2,927,191
Patented Mar. 1, 1960

2,927,191
SERVO POWER FEED

Victor E. Matulaitis, Franklin, Mich., assignor to Elox Corporation of Michigan, Clawson, Mich., a corporation of Michigan Application February 10, 1959, Serial No. 792,436

5 Claims. (Cl. 219—69)

This invention relates to servo power feeds for machine tool equipment, particularly power feed apparatus for electrical-discharge-machining equipment.

The primary object of my invention is to provide a power feed control means for electrical-discharge-machining equipment that eliminates instability in the control circuit and "hunting" of the eroding tool, especially with high machining rates.

Another object is to provide an improved feed control especially suited for use in electrical-discharge grinding operations where eccentricity of the grinding wheel or workpiece frequently produces instability of operation of the power feed.

A further object is to provide a servo control with improved recovery characteristics following a disturbance in the machining gap.

Still another object is to provide in such a control, means causing instantaneous retraction of the electrode from the workpiece at a preselected maximum rate in response to a short-circuiting of the gap, followed by immediate cessation of retracting movement upon clearing of the short circuit, a period of rest, then gradually accelerated infeeding of the electrode until the normal gap distance is reached.

A still further object is to provide a servo input control circuit operable to "paralyze" the electrode in response to any selected abrupt drop in gap voltage (caused by short-circuit or not) and thereafter to re-establish normal infeed.

Other objects and advantages will be apparent from the following specification which, taken in conjunction with the accompanying drawings, discloses a preferred form of the device.

Figure 2:
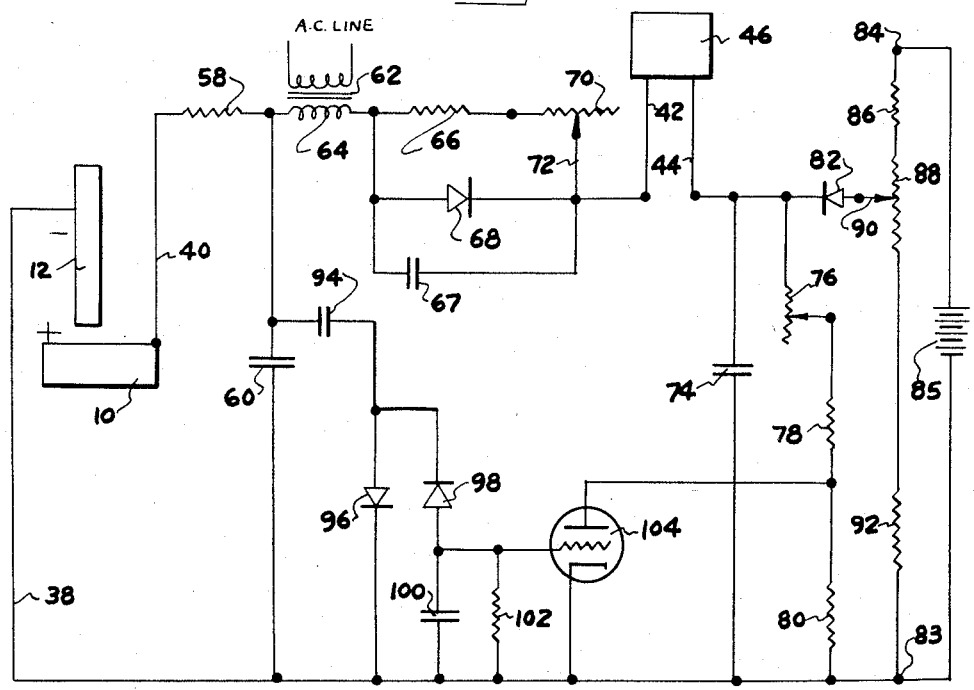

In the drawings:

Fig. 1 is a block diagram showing the relationship of the various components of an electrical-discharge-machining system with an automatic power feed; and Fig. 2 is a schematic diagram of my improved power feed control circuit.

Referring to the drawings, it may be seen that a workpiece 10 to be machined is suitably secured to a table or base (not shown) and means is provided for circulating dielectric coolant through the gap between the workpiece and an electrode 12. The latter is of metal and is held in a collet 14 which is mechanically secured to, but electrically insulated from, a support 18 by an insulator 16. The tool holder is mounted in a quill 20 which is supported and guided by suitable means as is conventional in the machine tool art.

Quill 20 is provided with rack teeth engaged by a pinion 22 which is driven by a reversible electric motor 26 through a suitable reduction gearing transmission indicated at 24.

A gap power supply 30, preferably of the unidirectional current pulsing type, is connected across the gap between the electrode and the workpiece with the negative terminal connected to the electrode 12 by lead 32 and the positive terminal connected to the work 10 by a lead 34.

An error sensing circuit 36 is connected across the machining gap by leads 38 and 40, and this circuit is connected to an amplifier 46 by leads 42, 44. The power supply 52 for the servo-means is connected to the servo amplifier by leads 48, 50, and leads 54, 56, connect the output of the power supply and amplifier to the motor 26 as will be further explained. Briefly, the error sensing component 36 detects any deviation from preselected gap voltage corresponding to a desired spacing between the electrode 12 and workpiece 10 and transmits a signal to the motor 26 which causes the latter to correct the deviation. The signal from the gap as sensed by the component 36 is amplified by component 46 with power from supply 52.

The circuitry of component 36 is shown schematically in Fig. 2, and operation of the error sensing circuit may be considered in the light of three phases of operation of the EDM equipment, i.e.

(1) Steady electrode downfeed;
(2) Steady electrode backup;
(3) Downfeed following a gap transient.

As will be seen from Fig. 2, a resistor 58 and condenser 60 are connected in series across the leads 38, 40, which lead from the gap, thus constituting a network which stores a voltage equal to the average voltage across the gap. With an assumed steady state condition at the gap—such as the open circuit voltage which prevails during the time the electrode is approaching the work before cutting begins, or during such time as the gap voltage remains substantially constant during cutting—the voltage at the juncture of 58—60 will remain substantially constant and equal to the average gap voltage.

Secondary 64 of transformer 62 is connected to the juncture 58—60 and furnishes a "dither" or "jitter" voltage to the servo motor circuit which eliminates freezing of the armature at its null or zero condition. The other end of secondary 64 is connected to diode 68, the positive side of the latter being connected to input lead 42 of servo amplifier 46. Connected in parallel with diode 68 is a condenser 67 and a series connected resistor 66 and rheostat 70, the arm 72 of the latter being the variable voltage terminal.

A source of reference voltage 85 is connected between points 83 and 84 of the circuit. Resistors 86 and 92 and a potentiometer 88 are connected in series across this voltage. The movable contact 90 of the potentiometer thus provides a variable source of reference voltage which may be selected to provide desired gap voltage corresponding to the desired gap. A diode 82 is connected between the arm 90 and a condenser 74 so as to conduct freely between the potentiometer and condenser but block current flow in the opposite direction. The juncture of 82—74 is connected to input lead 44 of servo amplifier 46, and to point 83 (which is the same as lead 38) by the series connected resistors 78, 80, and rheostat 76. A triode 104 is connected in parallel with resistor 80.

The parameters of the above mentioned components are such that the resistance of 86, 88, 92, is low compared with that of 76, 78, 80. Also the resistance of 80 is high when compared with the effective resistance of triode 104 during such time as the latter is operating at substantially zero grid bias. The grid of tube 104 is connected to conductor 38 through a network comprising a condenser 100 and a grid leak resistor 102 connected in parallel and the network 100—102 is connected with the juncture of network 58—60 through condenser 94 and a parallel connection of diodes 96 and 98 of opposite polarity.

Let it be considered that all voltages and potentials in the circuit may be compared to ground or the zero potential of conductor 38 so long as average gap voltage, as read by the network 58—60, is greater than reference voltage at arm 90. Then current will flow from juncture 58—60 through secondary 64, diode 68, amplifier 46 and back to ground 38 through 76—78—80, and triode 104. In normal steady state operation, most of this "control current" flows through triode 104 with a relatively small amount flowing through relatively high value resistor 80. In fact, the circuit parameters are so chosen that this control current is insufficient to maintain the voltage at the junction of 74—76 at the level of the selected reference voltage except at such times that rheostat 76 is set to provide maximum resistance. Accordingly some current will also flow through arm 90, diode 82, and resistors 76, 78, 80. Thus it will be seen that the voltage difference between input leads 42—44 of servo amplifier 46 will be substantially equal to the differential between the gap voltage as averaged in the network 58—60, and the reference voltage at arm 90. This corresponds to a condition of downfeed and the excess of voltage at 58—60 over the reference arm 90 determines the relative downfeed signal produced by amplifier 46. A condition of null occurs when the voltage across condenser 60 exactly equals the reference setting at 90 and no feed of the electrode occurs except for the movement induced as a result of the A.C. dither voltage from secondary 64.

Should the voltage across the gap drop due to a full or partial short-circuit or due to an approach of the electrode to a position too close to the workpiece, current will flow from arm 90, through diode 82, servo-amplifier 46, rheostat 70, resistor 66 (diode 68 will be blocking at this condition), transformer secondary 64, resistor 58, lead 40 and through the gap to lead 38. This will cause the motor 26 to retract the electrode 12. It will be seen that inasmuch as the reference voltage at arm 90 may be varied widely, the voltage across leads 42—44 would also vary widely in normal operation. I find it advantageous to have the voltage across leads 42—44 remain substantially constant during motor back-up regardless of the setting of arm 90. This provides a constant backup rate for the electrode and is accomplished by providing a current flow limiting network which is described below.

An abrupt fall in potential at junction 58—60 will cause a charge readjustment in condensers 94 and 100 through diode 98. Let it be assumed that the voltage at 58—60 falls from 50 volts to zero, and that the numerical capacity value of 94 is ten times that of 100. The drop in voltage then will result in condenser 100 being charged to a negative voltage of $10/11 \times 50$, or approximately 45 volts. If thereafter retraction of the electrode 12 occurs so as to clear the gap, the voltage at junction 58—60 will rise rapidly to plus 50 volts and whatever charge condenser 94 lost in producing the negative voltage on condenser 100 will be replenished by flow of current through diode 96. Meanwhile the negative voltage on condenser 100 and on the grid of triode 104 will remain negative except as the charge on condenser 100 is gradually dissipated through grid leak resistor 102.

Accordingly, dependent upon circuit parameters, and these are a matter of choice in design, triode 104 is rendered substantially non-conducting for any preselected period of time, after which time it becomes progressively conductive. If resistor 80 be of correct value in terms of amplifier characteristics, the downfeed ability of the servo control is substantially paralyzed immediately pursuant to a clearing of the gap following a short circuit, and then becomes gradually operative. The net result is that while the motor 26 runs at maximum backup speed to clear the short circuit, once the gap is cleared, the motor stops, remains still or turns slowly as determined by selected parameters, for a second or two (or longer if desired) and then thereafter gradually increases its speed to maximum to restore optimum gap spacing.

The desirability of this behavior will be cleared from the following considerations:

The physical lengths of discharge gaps used in present day electrical-discharge-machining equipment are small—in the order of two or three thousandths for roughing and as small as one ten-thousandth for finishing. These minute gap lengths make it literally impossible to achieve the desired stability of control unless the feed rate control is adjusted to provide minimum possible speed when simple proportional types of servo input signal are used. An example will serve to clarify this point.

One commercial machine tool used for electrical discharge machining work is so geared that three turns of the small servo motor armature are required to advance the electrode holding quill one one-thousandth of an inch (.001). The maximum free running speed of the motor is approximately 4500 r.p.m. If this machine be used for a finish machining operation and the controls be set for maximum speed, it is immediately obvious that the servo will of necessity "over-run" and short circuit the gap on approaching the work because it is physically impossible for a motor which is turning at a speed of 4500 r.p.m. to come to a complete stop within one-third of an armature revolution or less (assuming the operating gap length to be approximately .0001"). When the motor backs up, it again must overtravel by some small amount. Then when the quill infeeds again if the motor accelerates to as low an instantaneous speed as 100 r.p.m., it will be incapable of stopping within the one-third armature revolution and the net result is that the machine will hunt.

With my invention, this difficulty is virtually eliminated because following any back-up operation, the armature will make two to three initial revolutions at an exceedingly low rate, and since the gap will be reduced to the "operating" length during this small amount of quill movement, stable operation will follow one or two "hunt" cycles even though the feed rate controls be set at their maximum positions.

The performance improvement which attends the use of my invention in electrical discharge grinding operations is even more marked. For example, consider a cylindrical grinding operation where the workpiece has some initial eccentricity. As the grinding wheel approaches the workpiece, the gap length will vary cyclically with rotation of the workpiece. With a simple proportional servo, the length of time expressed as a percentage of each revolution, that the gap length is short (i.e. when the "high" spot of the work is nearest the grinding wheel) will be small compared with the "open circuit" time. The net result will be that the servo will infeed more than it will stop or reverse. Consequently each revolution of the work will allow the grinding wheel to approach nearer and nearer to the workpiece. This infeed will be found to continue even when the wheel begins striking the work during some portion of the workpiece revolution, and if the operator does not immediately retard the power feed controls to the minimum feed rate position when this occurs either the workpiece, the machine tool or both will be damaged.

With the use of my invention, such "overfeeding" can not occur even though the feed rate controls be left in their maximum feed rate positions because the periodic gap voltage cycles will act to substantially paralyze the infeed ability of the servo and the time between revolutions of the workpiece is insufficient to permit any appreciable pickup of motor speed before the next impulse again completely stops armature rotation in the manner outlined above. The effect, therefore, is one of approach at maximum speed and an automatic reduction to zero speed when cutting begins, a retention of the low speed rate until such time as the eccentricity is ground away to a point where arc voltage does not vary cyclically with workpiece revolution, at which time full normal servo action becomes automatically restored.

In summary, means are provided operable in response to a sequence of signals indicating less than normal tool spacing followed by a signal indicating greater than normal tool spacing for paralyzing the servo-feed, that is, for causing the servo-feed to be substantially stationary for a short period of time when to advance the tool. That short period of time is, of course, several times as long as the normal response time of said servo-feed.

It will thus be seen that I have provided an improved sensing device for use with EDM servo-feed mechanisms which has the advantages set forth in the objects stated above.

I claim:

1. In combination with an electrically controlled servo-feed for controlling the position of a movable tool relative to a workpiece, an error sensing circuit for monitoring position of the tool including means for emitting a signal in response to deviation of tool position from preselected programmed movement thereof, means operable in response to a sequence of signals indicating less than normal tool spacing followed by a signal indicating greater than normal tool spacing for causing said servo-feed to remain substantially stationary for a short period then to advance the tool, said short period being several times as long as the normal response time of said servo-feed.

2. In combination with an electrically controlled servo-feed for controlling the position of a movable tool relative to a workpiece, an error sensing circuit for monitoring position of the tool including means for emitting a signal in response to deviation of tool position from preselected programmed movement thereof, means operable in response to a sequence of signals indicating less than normal tool spacing followed by a signal indicating greater than normal tool spacing for causing said servo-feed to remain substantially stationary for a short period then to advance the tool at a gradually increasing rate to full preset rate, said short period being several times as long as the normal response time of said servo-feed.

3. In combination with electrical machining apparatus having an electrode and servo-feed means for advancing and retracting said electrode relatively to a workpiece, means for controlling operation of said servo-feed means including a sensing circuit having means for measuring the proximity of the electrode and workpiece in terms of an electrical quantity which varies in accordance with the spacing between the electrode and workpiece, a stored reference electrical quantity, means for comparing the measured quantity with the stored reference quantity, means for transmitting a signal from said sensing circuit to said control means in response to said comparison, and means for causing said control means to substantially inhibit operation of said servo-feed means for a selected period in response to a sequence of signals indicating less than normal electrode spacing followed by greater than normal electrode spacing, said short period being several times as long as the normal response time of said servo-feed.

4. In combination with electrical-discharge-machining apparatus having an automatic electrode servo-feed, means for controlling operation of the servo-feed including a sensing circuit connected across the machining gap, said sensing circuit comprising means for measuring the average voltage existing across the machining gap, a reference voltage, means for comparing the gap voltage with the reference voltage, means for transmitting an appropriate signal to the servo-feed in response to said gap voltage attaining a magnitude higher or lower than said reference voltage such that said servo-feed is caused to retract the electrode in response to relatively low gap voltage and downfeed the electrode in response to relatively high gap voltage, and means operable in response to a rise in gap voltage above said reference following a fall in gap voltage below said reference for causing said servo-feed to remain substantially stationary for a short period then to downfeed the electrode, said short period being several times as long as the normal response time of said servo-feed.

5. The combination set forth in claim 4 wherein said last means comprises a network for comparing the gap voltage with the reference voltage, and a delay network operatively connected with said comparison network operative in response to relative drop in gap voltage followed by relative rise in gap voltage to delay signal of said relatively higher voltage for a predetermined period.

References Cited in the file of this patent

UNITED STATES PATENTS

| | | |
|---|---|---|
| 2,762,946 | Manchester | Sept. 11, 1946 |
| 2,783,411 | Matulaitis | Feb. 26, 1957 |
| 2,841,686 | Williams | July 1, 1958 |
| 2,882,437 | McKechnie | Apr. 14, 1959 |